(12) United States Patent
Ehara et al.

(10) Patent No.: US 8,289,899 B2
(45) Date of Patent: Oct. 16, 2012

(54) COMMUNICATION METHOD AND INTERMEDIATE NETWORK DEVICE WITH BRANCH SELECTION FUNCTIONS

(75) Inventors: Junichi Ehara, Kawasaki (JP); Shinya Hatakeyama, Kawasaki (JP); Tomoyuki Ueno, Kawasaki (JP); Ken Takashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 772 days.

(21) Appl. No.: 12/323,765

(22) Filed: Nov. 26, 2008

(65) Prior Publication Data

US 2009/0207772 A1 Aug. 20, 2009

(30) Foreign Application Priority Data

Feb. 18, 2008 (JP) ................. 2008-035537

(51) Int. Cl.
*H04W 4/00* (2009.01)
*H04W 36/00* (2009.01)
*H04B 7/216* (2006.01)
*H04L 12/56* (2006.01)
*H04L 12/413* (2006.01)
*H04M 1/00* (2006.01)

(52) U.S. Cl. ........ 370/328; 370/330; 370/331; 370/335; 370/389; 370/445; 455/442; 455/562.1

(58) Field of Classification Search .................. 370/230, 370/445, 335, 389, 331; 455/442, 562.1
See application file for complete search history.

(56) References Cited

U.S. PATENT DOCUMENTS

| | | | |
|---|---|---|---|
| 5,867,791 A | 2/1999 | Chambert | |
| 6,397,082 B1 * | 5/2002 | Searle | ........................ 455/562.1 |
| 6,539,227 B1 | 3/2003 | Jetzek et al. | |
| 6,754,493 B1 | 6/2004 | Jetzek | |
| 6,865,164 B1 | 3/2005 | Scribano et al. | |
| 6,965,772 B1 | 11/2005 | Mohebbi et al. | |
| 2001/0005377 A1 * | 6/2001 | Edgar et al. | ................... 370/445 |
| 2002/0141360 A1 * | 10/2002 | Baba et al. | ..................... 370/331 |
| 2006/0159016 A1 * | 7/2006 | Sagfors et al. | ................. 370/230 |

(Continued)

FOREIGN PATENT DOCUMENTS

EP 1078545 10/2004

(Continued)

OTHER PUBLICATIONS

3rd Generation Partnership Project; Technical Specification Group Radio Access Network; "FDD Enhanced Uplink; Overall description; Stage 2", (Release 6) 3GPP TS 25.309 V6.6.0 Published Mar. 2006.

(Continued)

*Primary Examiner* — Ian N Moore
*Assistant Examiner* — Kiet Tang
(74) *Attorney, Agent, or Firm* — Myers Wolin, LLC

(57) ABSTRACT

A communication method for use in a radio communications system in which a mobile station sends identical data to a plurality of radio base stations in a parallel fashion. The method determines which radio base stations should stop forwarding data to an intermediate network device managing them. The intermediate network device includes a monitor and a controller. The monitor checks continuity of sequence numbers affixed to data received from each radio base station, thereby detecting missing sequence numbers. Based on the statistics of missing sequence numbers, the controller selects which radio base station should be allowed to continue its data forwarding operation. The controller then requests the other, non-selected radio base stations to stop their data forwarding operation.

7 Claims, 14 Drawing Sheets

U.S. PATENT DOCUMENTS

| | | | | |
|---|---|---|---|---|
| 2007/0155388 A1* | 7/2007 | Petrovic et al. | ............... | 455/442 |
| 2008/0002656 A1 | 1/2008 | Lundh et al. | | |
| 2008/0298322 A1* | 12/2008 | Chun et al. | ............... | 370/335 |
| 2008/0317018 A1* | 12/2008 | Horvath et al. | ............... | 370/389 |

FOREIGN PATENT DOCUMENTS

| | | |
|---|---|---|
| EP | 1145586 | 3/2006 |
| GB | 2337416 | 11/1999 |
| JP | 09-261725 | 10/1997 |
| JP | 10-510404 | 10/1998 |
| JP | 2002-118598 | 4/2002 |
| JP | 2002-515713 | 5/2002 |
| JP | 2002-518962 | 6/2002 |
| JP | 2002-199431 | 7/2002 |
| JP | 2003-509895 | 3/2003 |
| JP | 2003-525533 | 8/2003 |
| JP | 2003-526228 | 9/2003 |
| JP | 2003-319464 | 11/2003 |
| JP | 2004-007084 | 1/2004 |
| JP | 2007-502559 | 2/2007 |
| JP | 2007-536792 | 12/2007 |
| JP | 2008-072451 | 3/2008 |
| WO | 96/18277 | 6/1996 |
| WO | 99/59365 | 11/1999 |
| WO | 99/66756 | 12/1999 |
| WO | 00/25532 | 5/2000 |
| WO | 00/38456 | 6/2000 |
| WO | 01/18996 | 3/2001 |
| WO | 2005/018256 | 2/2005 |
| WO | 2005/104672 | 11/2005 |
| WO | 2006/037378 | 4/2006 |

OTHER PUBLICATIONS

3rd Generation Partnership Project; Technical Specification Group Radio Access Network; "UTRAN Iub/Iur interface user plane protocol for DCH data streams", (Release 7) 3GPP TS 25.427 V7.5.0 Published Sep. 2007.

Notice of Reason for Refusal issued for corresponding Japanese Patent Application No. 2008-035537 dated May 29, 2012 with partial English translation.

* cited by examiner

COMMUNICATION METHOD AND INTERMEDIATE NETWORK DEVICE WITH BRANCH SELECTION FUNCTIONS

CROSS-REFERENCE TO RELATED APPLICATIONS

This application is based upon and claims the benefits of priority from the prior Japanese Patent Application No. 2008-035537, filed on Feb. 18, 2008, the entire contents of which are incorporated herein by reference.

FIELD

The embodiments discussed herein are related to a communication method and an intermediate network device for use in a radio communications system.

BACKGROUND

Modern mobile communications systems use code-division multiple access (CDMA) techniques to allow a plurality of terminals to transmit signals over the same physical media and share its capacity. To make faster broadband wireless communication possible, the 3rd Generation Partnership Project (3GPP) and other standardization committees have eagerly discussed next-generation mobile communications systems, in addition to improvement of the current systems.

Some mobile communications systems allow a mobile station to communicate concurrently with multiple radio base stations. Particularly, for enhanced quality of transmission in the uplink direction (i.e., from mobile station to radio base station), some of such communications systems permit a mobile station to send identical data to two or more radio base stations in a parallel fashion. Those radio base stations are managed by an intermediate network device called a radio network controller or base station controller. A plurality of data units with the same content flow into this intermediate network device, from the mobile station via different transmission paths (called "branches") between them. The intermediate network device selects and combines appropriate data units according to the transmission quality of each branch, thus sending the selected data to an upper network system (called "core network"). For details, see the following technical specifications of the 3rd Generation Partnership Project: (1) "FDD Enhanced Uplink; Overall description; Stage 2", 3GPP TS25.309, 2006-03, V6.6.0., (2) "UTRAN Iub/Iur interface user plane protocol for DCH data streams", 3GPP TS25.427, 2007-09, V7.5.0.

The above intermediate network device discards incoming data that has not been selected. In the case where sufficient quality of communication can be achieved by using some of the available branches (rather than all of them), the intermediate network device discards every data received from other branches. This could lead to a great disadvantage to the efficiency of data transport. Suppose, for example, that the mobile station is using three branches with a bandwidth of 5.8 Mbps per branch, or 17.4 Mbps in total. In the case where one of these three branches provides a sufficiently good quality, the other branches of 11.6 Mbps are eventually wasted. In addition, the intermediate network device has to deal with an increased processing load, which could result in an extra transmission delay and packet loss.

Several researchers have proposed a method to reduce the amount of data flowing into an intermediate network device. See, for example, Published Japanese Translation No. 2007-502559 of PCT Patent Application No. PCT/EP2004/006560. According to this proposed method, each radio base station monitors quality of a radio link used to communicate with a mobile station, thus identifying which radio base stations, if any, are experiencing poor radio conditions. The method then restricts those radio base stations from forwarding received data to the intermediate network device.

However, quality of a radio link section is not the only factor that determines quality of data flowing into an intermediate network device from each branch. Suppose, for example, that a radio base station experiences congestion in its connection to the intermediate network device. Under this situation, quality degradation would be observed in the data received from the radio base station even if the corresponding radio link is in good condition. The conventional method proposed in the aforementioned PCT patent application is unable to adequately determine which radio base stations should stop forwarding data from the mobile station.

SUMMARY

According to one aspect of the invention, there is provided a communication method for use in a radio communications system including a plurality of radio base stations to receive data transmitted from a mobile station over radio links and an intermediate network device to collect the received data from the radio base stations via a network. According to this communication method, identical data is transmitted from the mobile station to the plurality of radio base stations in a parallel fashion. The data is then forwarded from each radio base station to the intermediate network device. The data received at the intermediate network device is subjected to a process of checking sequence numbers affixed thereto, thereby detecting missing sequence numbers. Based on the statistics of those missing sequence numbers, at least one of the radio base stations is selected and permitted to continue data forwarding operation, while the non-selected radio base stations are requested to stop data forwarding operation.

According to another aspect of the invention, there is provided an intermediate network device, for use in a radio communications system including a plurality of radio base stations to receive data from a mobile station via radio links. The intermediate network device collects the received data from the radio base stations via a network, and to this end, the intermediate network device includes a monitor and a controller. When the mobile station transmits identical data to the plurality of radio base stations in a parallel fashion, the monitor checks sequence numbers affixed to data received from each of the radio base stations, thereby detecting missing sequence numbers. The controller selects at least one of the radio base stations based on statistics of the missing sequence numbers and permits the selected radio base station to continue data forwarding operation, while requesting non-selected radio base stations to stop data forwarding operation.

Objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Figure 1:
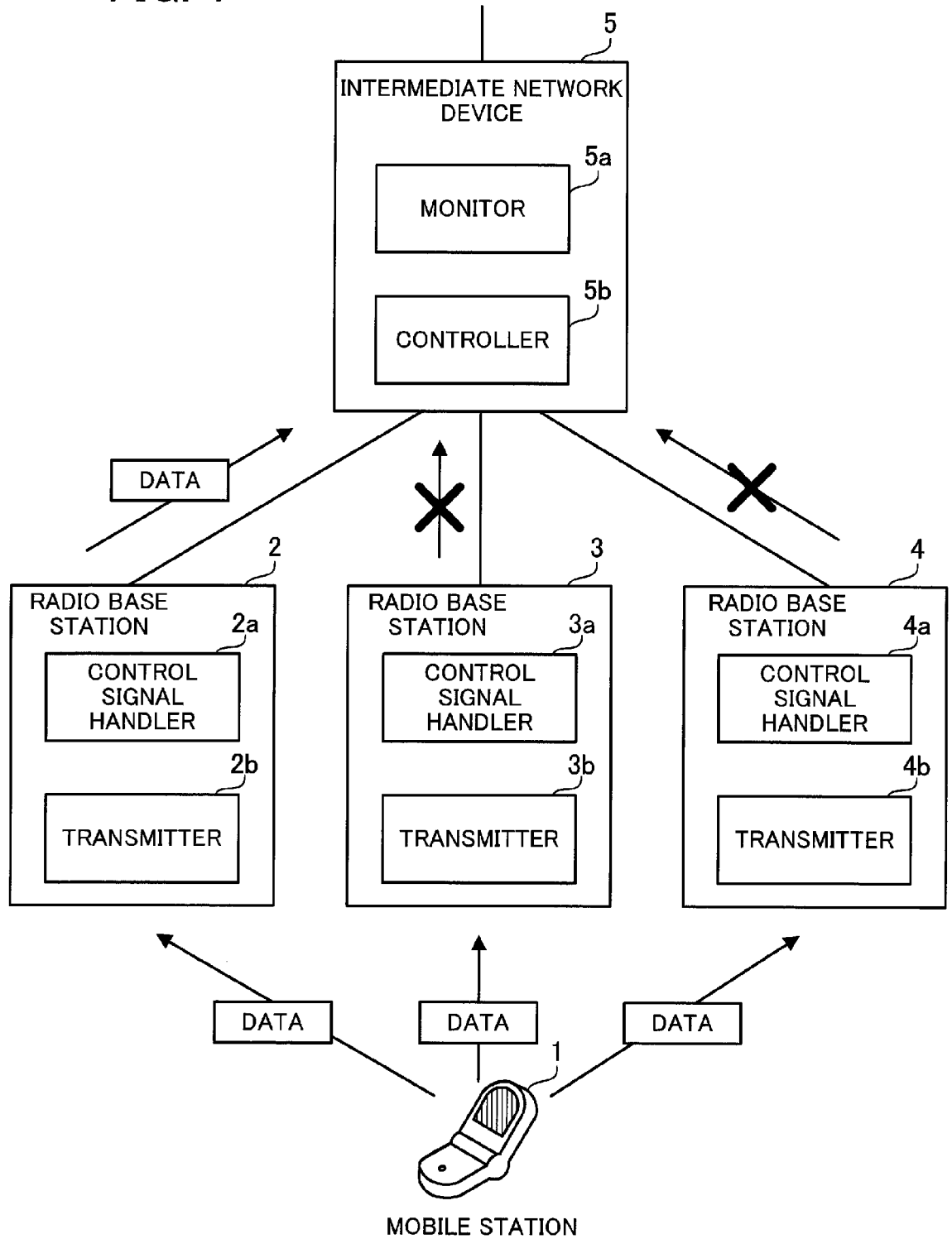
FIG. 1 gives an overview of preferred embodiments of the present invention.

Preferred embodiments of the present invention will now be described in detail below with reference to the accompanying drawings, wherein like reference numerals refer to like elements throughout. The description begins with an overview of the present invention and then proceeds to more specific embodiments of the invention.

FIG. 1 gives an overview of preferred embodiments of the present invention. FIG. 1 illustrates a radio communications system that allows a mobile station to communicate with another mobile station via radio base stations. Specifically, the illustrated radio communications system includes a mobile station 1, three radio base stations 2, 3, and 4, and an intermediate network device 5. The radio base stations 2, 3, and 4 are linked to the intermediate network device 5 via a wired or wireless network.

The mobile station 1 is a wireless communication terminal (e.g., cellular phone) that can communicate with radio base stations 2, 3, and 4 over radio links. The mobile station 1 is designed to concurrently communicate with a plurality of radio base station 2, 3, and 4. Particularly, for uplink data transport, the mobile station 1 can transmit identical data to those radio base stations 2, 3, and 4 in a parallel fashion.

The radio base stations 2, 3, and 4 are network devices that communicate with the mobile station 1. The first radio base station 2 illustrated at the left in FIG. 1 has a control signal handler 2a and a transmitter 2b. Likewise, the second radio base station 3 at the center has a control signal handler 3a and a transmitter 3b. The third radio base station 4 at the right has a control signal handler 4a and a transmitter 4b.

The control signal handlers 2a, 3a, and 4a perform processing functions specified by a control signal received from the intermediate network device 5. More specifically, when they receive a control signal requesting to stop forwarding data, the control signal handlers 2a, 3a, and 4a command their respective transmitters 2b, 3b, and 4b to stop data forwarding operation. Likewise, when a received control signal requests to resume data transmission, the control signal handlers 2a, 3a, and 4a command their respective transmitters 2b, 3b, and 4b to resume data forwarding operation.

Upon receipt of data from the mobile station 1, the transmitters 2b, 3b, and 4b handle the data under the control of their corresponding control signal handlers 2a, 3a, and 4a. More specifically, the transmitters 2b, 3b, and 4b are initially configured to forward data from the mobile station 1 to the intermediate network device 5. This initial mode applies when the mobile station 1 begins a communication session. The transmitters 2b, 3b, and 4b discard received data without sending it to the intermediate network device 5 when the control signal handlers 2a, 3a, and 4a command them to stop forwarding. The transmitters 2b, 3b, and 4b will stay in this mode until they receive a resume command.

The intermediate network device 5 is a communication device that connects radio base stations 2, 3, and 4 to an upper-layer network to transport data between them. The intermediate network device 5 concentrates incoming data from the radio base stations 2, 3, and 4 and forwards them to the upper-layer network. During this process, the intermediate network device 5 selects and combines identical data received through different branches.

The intermediate network device 5 has a monitor 5a and a controller 5b. When the mobile station 1 is operating in a mode where it sends identical data to multiple radio base stations 2, 3, and 4, the monitor 5a monitors each branch to check sequence numbers affixed to received data. The mobile station 1 gives a number to each data unit before transmitting it. The radio base stations 2, 3, and 4 also give a number to each data unit before forwarding it. Those numbers can serve as the sequence numbers for monitoring purposes. Specifically, the monitor 5a checks whether there is a missing sequence number in each branch. A lack of a sequence number means that some part of the transmitted data has been lost on the way to its destination because of packet loss or data error or any other reason.

Transmitted data units may not arrive in the same order as they are transmitted because of non-uniform delays on the way. Preferably, the monitor 5a waits for a predetermined time before it begins to check the sequence number of each received data unit.

The controller 5b selects at least one of the radio base stations 2, 3, and 4 that should be allowed to continue data forwarding operation, based on the statistics of missing sequence numbers detected by the monitor 5a. For example, the controller 5b selects a radio base station with the smallest number of missing sequence numbers. Then the controller 5b issues control signals to request the other (i.e., non-selected) radio base stations to stop their data forwarding operation. The controller 5b may later find the selected radio base station experiencing an increased number of missing sequence numbers. If this is the case, the controller 5b commands inactive radio base stations to resume data forwarding operation.

The above radio communications system operates as follows. The intermediate network device 5 receives a series of data units from radio base stations 2, 3, and 4. The monitor 5a in the intermediate network device 5 watches sequence numbers affixed to those data units, thus detecting missing sequence numbers, if any. Based on the statistics of such missing sequence numbers, the controller 5b in the intermediate network device 5 determines which radio base stations should be allowed to continue data forwarding operation. The controller 5b commands non-selected radio base stations to stop their data forwarding operation. Depending on the situation, the non-selected radio base stations may later receive a command that allows them to resume data forwarding operation.

The intermediate network device 5 controls incoming data in this way, not only reducing traffic over radio channels from the radio base stations 2, 3, and 4, but also alleviating the processing load of the intermediate network device 5 itself. Advantageously, the proposed radio communications system checks the sequence number of each received data unit so as to make a sensible selection of which radio base station to use, with consideration of at least the quality of links between the radio base station 2, 3, and 4 and intermediate network device 5. The radio communications system may also check sequence numbers that the mobile station 1 assigns to uplink data. In this case, the radio communications system will consider transmission quality of the entire data path between the mobile station 1 and intermediate network device 5, including radio links.

[a] First Embodiment

A first embodiment of the present invention will now be described in detail below with reference to the accompanying drawings.

Figure 2:
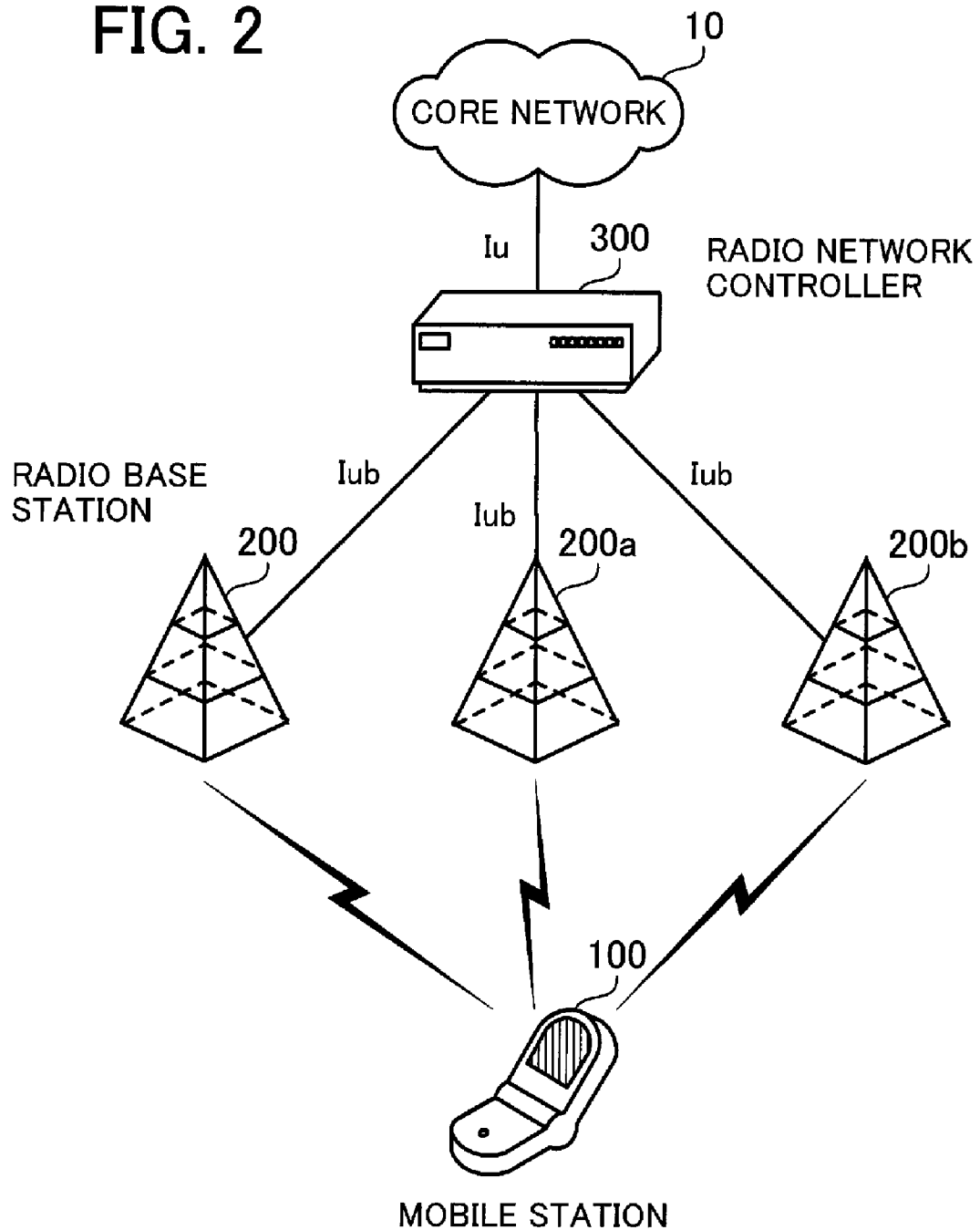
FIG. 2 illustrates a structure of a radio communications system according to a first embodiment of the present invention.

FIG. 2 illustrates a structure of a radio communications system according to a first embodiment of the present invention. This radio communications system permits a mobile station to communicate with another mobile station via radio base stations. According to the first embodiment, the radio communications system includes a core network 10, a mobile station 100, radio base stations 200, 200a, and 200b, and a radio network controller 300. The radio base station 200, 200a, and 200b are linked to the radio network controller 300 via a wired network. The radio network controller 300 is further linked to the core network 10.

The mobile station 100 is a wireless communication terminal that can communicate with a plurality of radio base stations 200, 200a, and 200b over radio links, not only selectively, but also concurrently. The first embodiment is directed to the latter case. In other words, the first embodiment assumes three branches formed between the mobile station 100 and radio network controller 300. When transmitting data using uplink channels, the mobile station 100 sends identical data to the radio base station 200, 200a, and 200b in a parallel fashion. During this process, the mobile station 100 gives each data unit a sequence number called "Transmission Sequence Number" (TSN). TSN is a serial number for identifying each transmitted data unit, so that the receiving end can use TSN to rearrange received data units into a correct sequence or to check the presence of lost data units.

The radio base stations 200, 200a, and 200b are network devices that communicate with the mobile station 100. Upon receipt of data units from the mobile station 100 over radio channels, the radio base stations 200, 200a, and 200b forward them to their radio network controller 300 in combined data form, called EDCH-FP frames. EDCH-FP stands for Enhanced Dedicated Channel—Frame Protocol. During this process, the radio base stations 200, 200a, and 200b give a sequence number to each EDCH-FP frame. This sequence number is called a "Frame Sequence Number" (FSN). FSN is a serial number for identifying each individual frame, so that the receiving end can use FSN to rearrange received data units into a correct sequence or to check the presence of lost data units. The radio base stations 200, 200a, and 200b do not produce EDCH-FP frames when a forwarding stop command received from the radio network controller 300 is effective.

The radio network controller 300 is an intermediate network device that controls its subordinate radio base stations 200, 200a, and 200b and forwards data between those radio base stations 200, 200a, and 200b and the core network 10. The radio network controller 300 may also be called a "Base Station Controller" (BSC). When identical data units have arrived from a plurality of branches, the radio network controller 300 selects and combines received data units before sending them out to the core network 10. The radio network controller 300 also monitors transmission quality of each branch and commands some radio base stations, as necessary, to stop forwarding data.

The above-described radio communications system can be realized as a CDMA communications system with the functions of High-Speed Uplink Packet Access (HSUPA), a standard of 3GPP. The rest of this description will use the acronym "RNC" to refer to the foregoing radio network controller, together with its reference numeral "300." The term "Iub link" will be used to refer to each link connecting the radio base stations 200, 200a, and 200b with the RNC 300, which the mobile station 100 uses to send and receive data. The term "Iu link" refers to the link between the RNC 300 and core network 10.

The following section will describe modules contained in the radio base station 200 and RNC 300. Other radio base stations 200a and 200b have the same modular structure as that of the radio base station 200.

Figure 3:
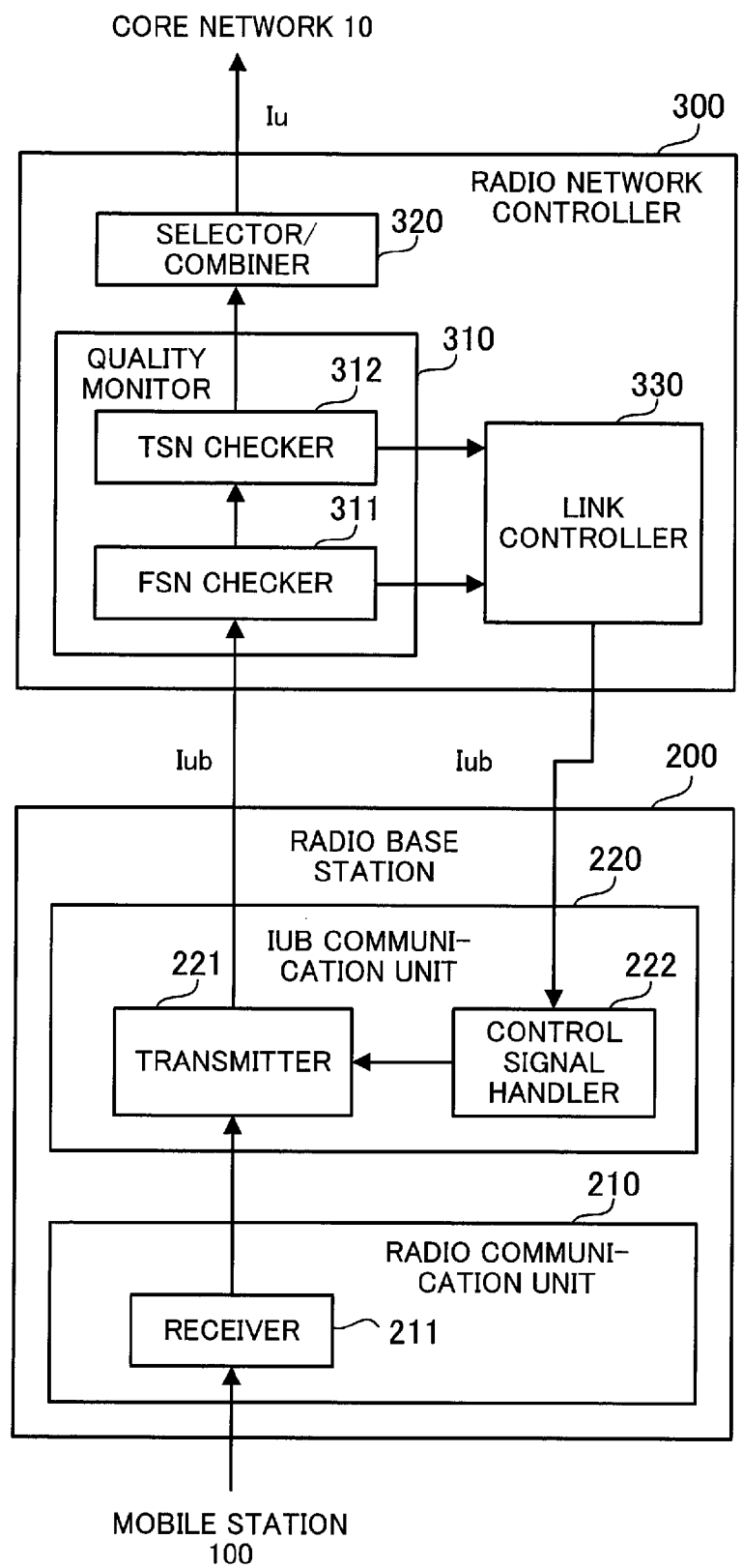
FIG. 3 is a functional block diagram illustrating a radio base station and a radio network controller (RNC) according to the first embodiment.

FIG. 3 is a functional block diagram illustrating a radio base station and an RNC according to the first embodiment. The illustrated radio base station 200 has a radio communication unit 210 and an Iub communication unit 220. The illustrated RNC 300 has a quality monitor 310, a selector/combiner 320, and a link controller 330. The description will focus on how the RNC 300 handles data propagating in the uplink direction (i.e., from the mobile station 100 to the RNC 300), while omitting details of other functions.

The radio communication unit 210 controls communication with the mobile station 100 over a radio link. Included in this radio communication unit 210 is a receiver 211 which extracts data from radio signals received from the mobile station 100 by demodulating and decoding them. The receiver 211 supplies the extracted data to the Iub communication unit 220, together with various pieces of control information indicating current condition of the radio link section. Note that each data unit supplied to the Iub communication unit 220 bears a TSN.

The Iub communication unit 220 controls communication with the RNC 300. Included in this Iub communication unit 220 are a transmitter 221 and a control signal handler 222. The transmitter 221 operates in either non-restricted forwarding mode or restricted forwarding mode. Non-restricted forwarding mode is selected as an initial state when the mobile station 100 begins data transmission. In this non-restricted forwarding mode, the transmitter 221 assembles an EDCH-FP frame from data and control parameters supplied from the radio communication unit 210 and transmits it to the RNC 300. Each transmitted EDCH-FP frame is given an FSN. In restricted forwarding mode, on the other hand, the transmitter 221 discards data and control parameters, thus transmitting no EDCH-FP frames.

The control signal handler 222 controls the transmitter 221 according to control signals from the RNC 300. More specifically, received control signals may include a command requesting to stop data forwarding operation or that requesting to resume data forwarding operation. If the former is the case, the control signal handler 222 brings the transmitter 221 to restricted forwarding mode. If the latter is the case, the control signal handler 222 brings the transmitter 221 back to non-restricted forwarding mode.

The quality monitor 310 receives EDCH-FP frames from at least one of the radio base stations 200, 200a, and 200b, while monitoring continuously the transmission quality of each branch. When the mobile station 100 begins transmitting data, the quality monitor 310 initially receives EDCH-FP frames from all radio base stations 200, 200a, and 200b.

The quality monitor 310 includes an FSN checker 311 and a TSN checker 312. The FSN checker 311 checks, for each branch, the continuity of FSNs of EDCH-FP frames received through that branch, thereby detecting missing FSNs. Since frames may not always arrive at the RNC 300 in the same order as they are transmitted, the FSN checker 311 does not determine whether an FSN is present or missing until a predetermined time elapses after the expected arrival of a frame. This wait time may be as long as a maximum delay time that incoming EDCH-FP frames are allowed to have. The FSN checker 311 notifies the link controller 330 of the result of this FSN checking, besides forwarding received EDCH-FP frames to the subsequent TSN checker 312.

Upon receipt of EDCH-FP frames from the FSN checker 311, the TSN checker 312 disassembles each frame back into original data units that the mobile station 100 has transmitted. For each branch, the TSN checker 312 checks the continuity of TSNs of the data units, thereby detecting missing TSNs. The TSN checker 312 then notifies the link controller 330 of the result of its TSN checking while supplying the obtained data units to the selector/combiner 320.

A lack of FSN could happen as a result of packet loss or uncorrectable bit error in the Iub link. A lack of TSN could happen as a result of packet loss or uncorrectable bit error in the radio link section or Iub link. Accordingly, the statistics of missing FSNs and missing TSNs represents transmission quality of each branch.

Upon receipt of data from the quality monitor 310, the selector/combiner 320 identifies a plurality of data units with the same content. In the initial state, the selector/combiner 320 receives three identical data units corresponding to three different branches. The selector/combiner 320 selects and combines such data units according to their quality, thereby narrowing them down to a single data stream for output to the core network 10.

The link controller 330 calculates a quality indicator indicating transmission quality of each branch, based on the statistics of FSNs and TSNs that is obtained from the quality monitor 310. Then, depending on whether the current quality indicator of each branch satisfies predetermined quality requirements, the link controller 330 issues control signals to command the radio base stations 200, 200a, and 200b to stop or resume data forwarding operation.

Figure 4:
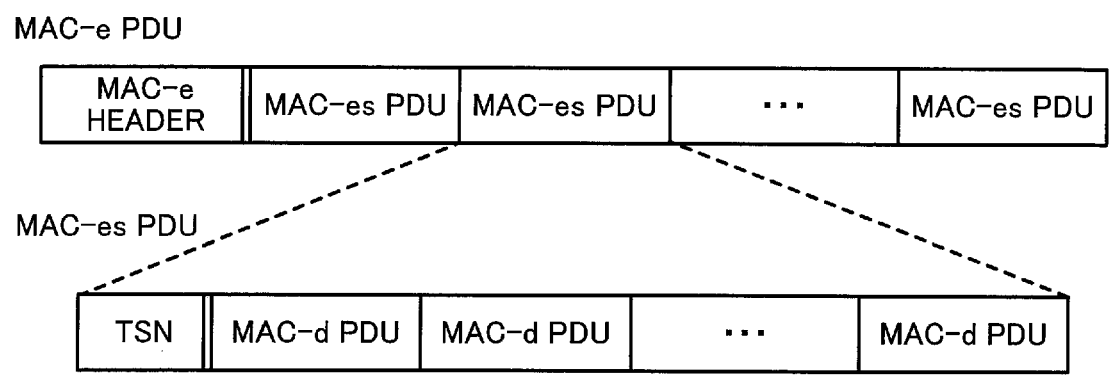
FIG. 4 illustrates an example of a frame that a mobile station transmits to a radio base station.

FIG. 4 illustrates an example of a frame that a mobile station transmits to a radio base station. Specifically, illustrated in FIG. 4 is a MAC-e PDU, or data unit of MAC-e layer, where MAC stands for medium access control, and PDU stands for protocol data unit. MAC-e PDUs are produced at the mobile station 100 and terminated at the radio base stations 200, 200a, and 200b. The produced MAC-e PDUs are carried by a radio signal that is assigned in the physical layer.

Each MAC-e PDU is formed from a MAC-e header and a plurality of MAC-es PDUS. MAC-e header is a header added by MAC-e layer, and MAC-es PDUs are data units of MAC-es layer lying above MAC-e layer. MAC-es PDUs are produced at the mobile station 100 and terminated at the RNC 300.

Each MAC-es PDU is formed from a TSN and a plurality of MAC-d PDUs. TSN is a serial number identifying each particular MAC-es PDU. The RNC 300 uses those TSNs to rearrange, select, and combine MAC-es PDUs. MAC-d PDUs are data units of MAC-d layer, which lies above MAC-es layer. MAC-d PDUs are produced at the mobile station 100 and terminated at the RNC 300.

Figure 5:
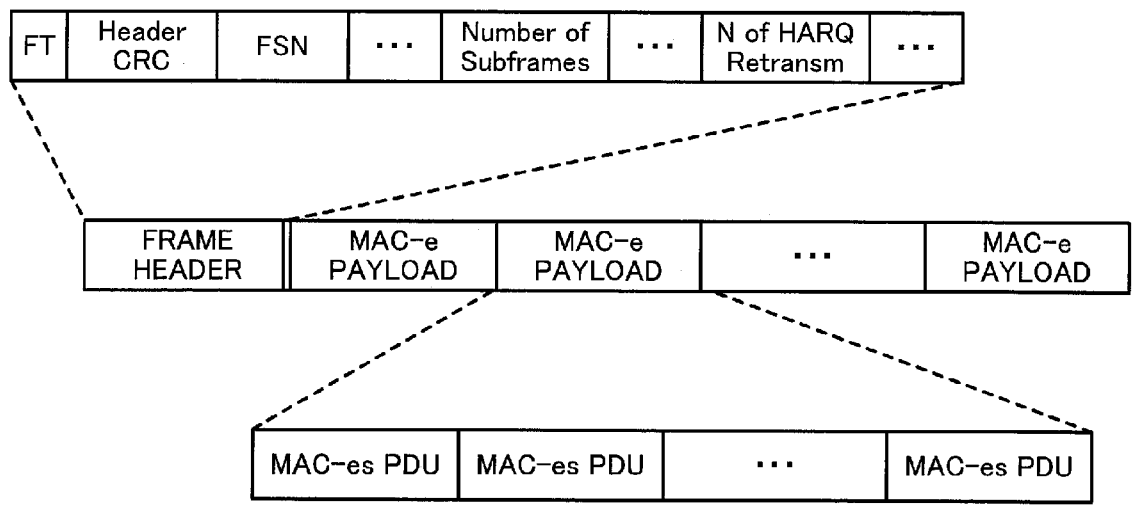
FIG. 5 illustrates an example of a frame that a radio base station transmits to RNC.

FIG. 5 illustrates an example of a frame that a radio base station transmits to RNC. Specifically, illustrated in FIG. 5 is an EDCH-FP frame, or data unit of EDCH-FP layer located below MAC-es layer. EDCH-FP frames are produced at the radio base stations 200, 200a, and 200b and terminated at the RNC 300. As FIG. 5 illustrates, each EDCH-FP frame is formed from a frame header and a plurality of MAC-e payloads.

The frame header, which is added in EDCH-FP layer, has the following data fields: "Frame Type" (FT), "Header CRC," "Frame Sequence Number" (FSN), "Number of Subframes," and "Number of HARQ retransmissions" (N of HARQ Retransm).

Frame Type field is a single-bit field indicating whether the frame is a control frame (FT=1) or a data frame (FT=0). Header CRC field contains a cyclic redundancy check (CRC) code serving as an error correction code for detecting bit errors in the frame header. FSN field contains a sequence number given at the radio base stations 200, 200a, and 200b. Number of Subframes field indicates how many MAC-e payloads follow the header. Number of HARQ Retransmissions field indicates how many times the mobile station 100 has retransmitted a MAC-e PDU for successful reception of that MAC-e PDU. This field repeats for each MAC-e payload.

MAC-e payload is the payload part of a MAC-e PDU received from the mobile station 100. Specifically, MAC-e payload contains a plurality of MAC-es PDU as illustrated in FIG. 4. Each of those MAC-es PDUs has a unique TSN to distinguish itself from other MAC-es PDUs.

Figure 6:
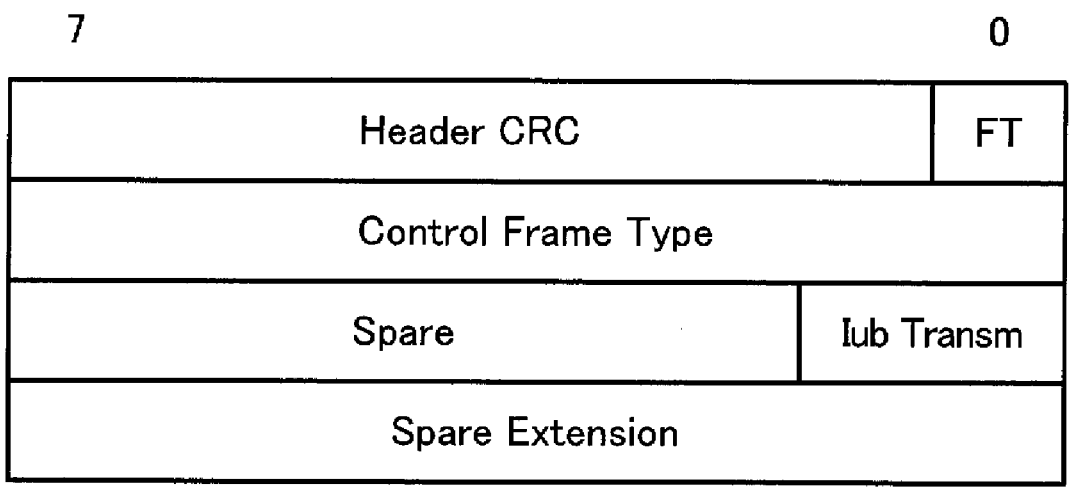
FIG. 6 illustrates a first example of a control frame that RNC transmits to radio base stations.

FIG. 6 illustrates a first example of a control frame that RNC transmits to radio base stations. The illustrated control frame is what the RNC 300 transmits to request radio base stations to stop or resume their data forwarding operation. This control frame has the following data field: "Frame Type" (FT), "Header CRC," "Control Frame Type," and "Iub Transmission" (Iub Transm). The other data areas (labeled "Spare" or "Spare Extension") are not used at present. Each line of the control frame of FIG. 6 represents data of one byte (or eight bits). Bit 0 at the rightmost position is the least significant bit. Bit 7 at the leftmost position is the most significant bit.

Frame Type field is a single-bit field containing, in this case, a value of "1" to indicate that the frame is a control frame. Header CRC field contains an error correction code for detecting bit errors in the frame header. Control Frame Type field contains a code indicating the type of the control frame. In the present embodiment, this field contains a specific code indicating that the frame requests the recipient to stop or resume data forwarding operation. Iub Transmission field contains a two-bit code specifying what the control frame is requesting to the receiving radio base station. More specifically, "00" specifies the receiving radio base station to perform default normal operation; "10" to stop data forwarding operation; "11" to resume data forward operation. Nothing is assigned to the remaining code "01" in the present example.

The control frame format illustrated in FIG. 6 is defined as a new type of control frame, which is not included in the 3GPP standard specifications. Alternatively, an existing control frame definition of 3GPP may be extended to achieve the purpose of the present embodiment as will be described below.

Figure 7:
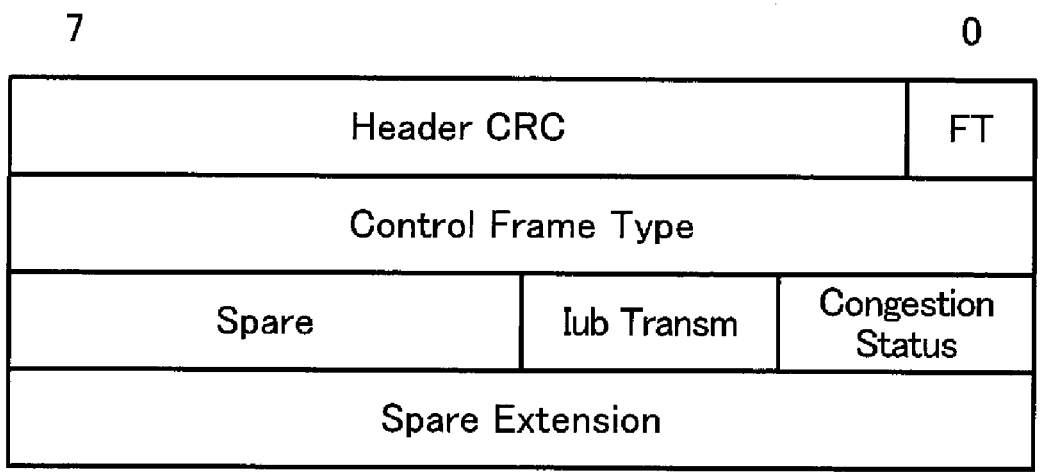
FIG. 7 illustrates a second example of a control frame that RNC transmits to radio base stations.

FIG. 7 illustrates a second example of a control frame that RNC transmits to radio base stations. The illustrated control frame is an extended version of an existing control frame known as TNL Congestion Indicator. TNL Congestion Indicator is used by an RNC to inform its radio base stations that their Iub link is congested. This control frame has the following data fields: "Frame Type" (FT), "Header CRC," "Control Frame Type," "Congestion Status," and "Iub Transmission" (Iub Transm). The other data areas (labeled "Spare" or "Spare Extension") are not used. Each line of the control frame of FIG. 7 represents data of one byte (or eight bits). Bit 0 at the rightmost position is the least significant bit. Bit 7 at the leftmost position is the most significant bit.

The definitions of Frame Type, Header CRC, Control Frame Type, and Iub Transmission fields are the same as those explained in FIG. 6. Congestion Status field contains a code indicating the degree of Iub link congestion. Iub Transmission field is assigned to an unused area of the original TNL Congestion Indicator. The RNC 300 may be configured to use this extended version of an existing control frame so as to command its subordinate radio base stations 200, 200a, and 200b to stop or resume their data forwarding operation.

The following section will now describe detailed processes that the above-described radio communications system executes by using above-described data structures. The description is first directed to a method of calculating a quality indicator that indicates transmission quality of each branch. The description will then turn to a process of controlling a radio base station by using the calculated quality indicator, so as to stop its data forwarding operation.

Figure 8:
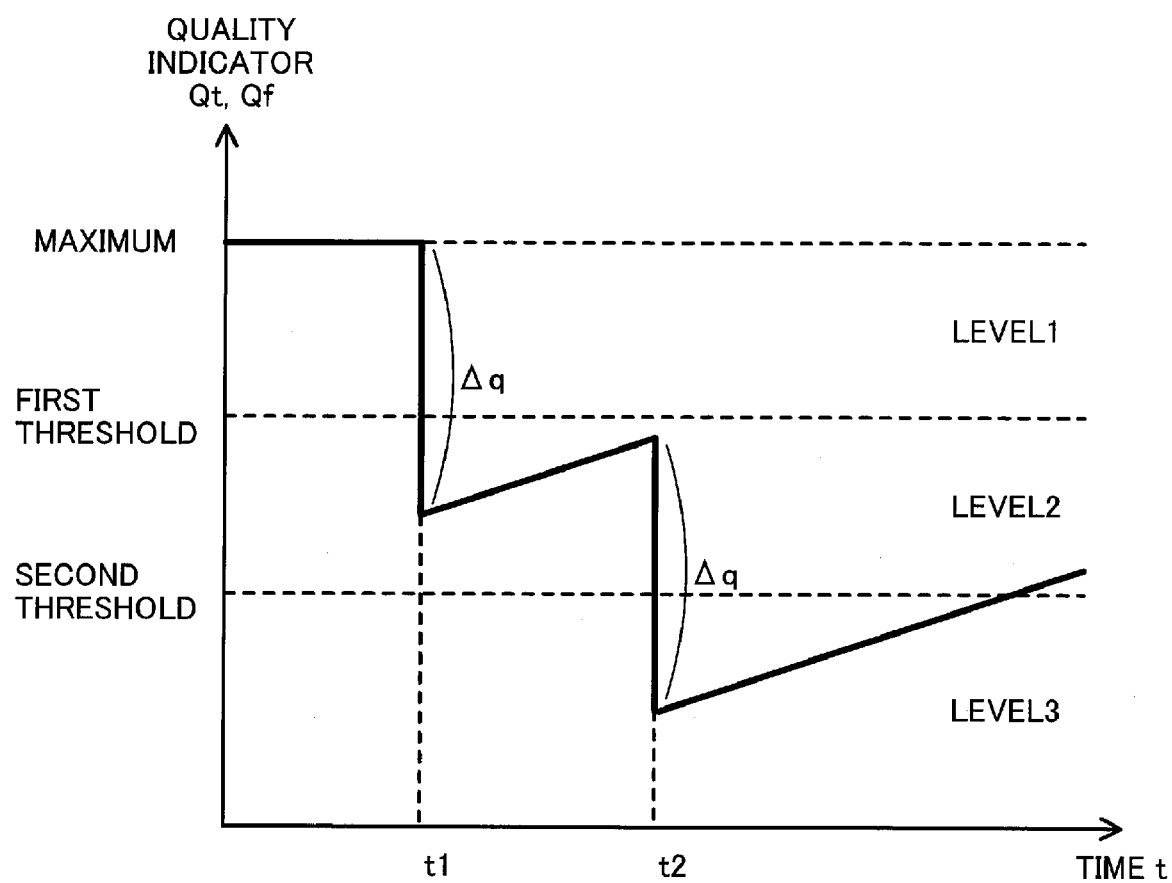
FIG. 8 depicts how to calculate a quality indicator indicating quality of data transmission.

FIG. 8 depicts how to calculate a quality indicator indicating quality of data transmission. In the RNC 300, the link controller 330 calculates a quality indicator Qt from observation of missing TSNs, as well as another quality indicator Qf from observation of missing FSNs. The link controller 330 calculates those quality indicators for each individual branch, thus quantifying the transmission quality of each branch. Since both quality indicators Qt and Qf can be obtained with similar algorithms, the following description will focus on one quality indicator Qt.

Upon establishment of a branch, the link controller 330 gives a predefined maximum value to quality indicator Qt as its initial value. If there is a report of missing TSNs from the TSN checker 312, the link controller 330 subtracts a predefined value Δq from Qt, thereby imposing a penalty to the branch. FIG. 8 specifically illustrates such events at two time points t1 and t2. The link controller 330, on the other hand, increases Qt by a predefined increment each time a new TSN comes, within the limit of the maximum value mentioned above.

The resulting values of Qt are classified into three ranges: level 1, level 2, and level 3. Level 1 refers to the case where quality indicator Qt equals or exceeds a predefined first threshold, which means no or almost no lack of TSNs, or good transmission quality of the branch. Level 2 refers to the case where quality indicator Qt is smaller than the first threshold and equals or exceeds a predefined second threshold, which means occasional lack of TSNs, or mediocre transmission quality of the branch. Level 3 refers to the case where quality indicator Qt is smaller than the second threshold, which means frequent lack of TSNs, or poor transmission quality of the branch.

Figure 9:
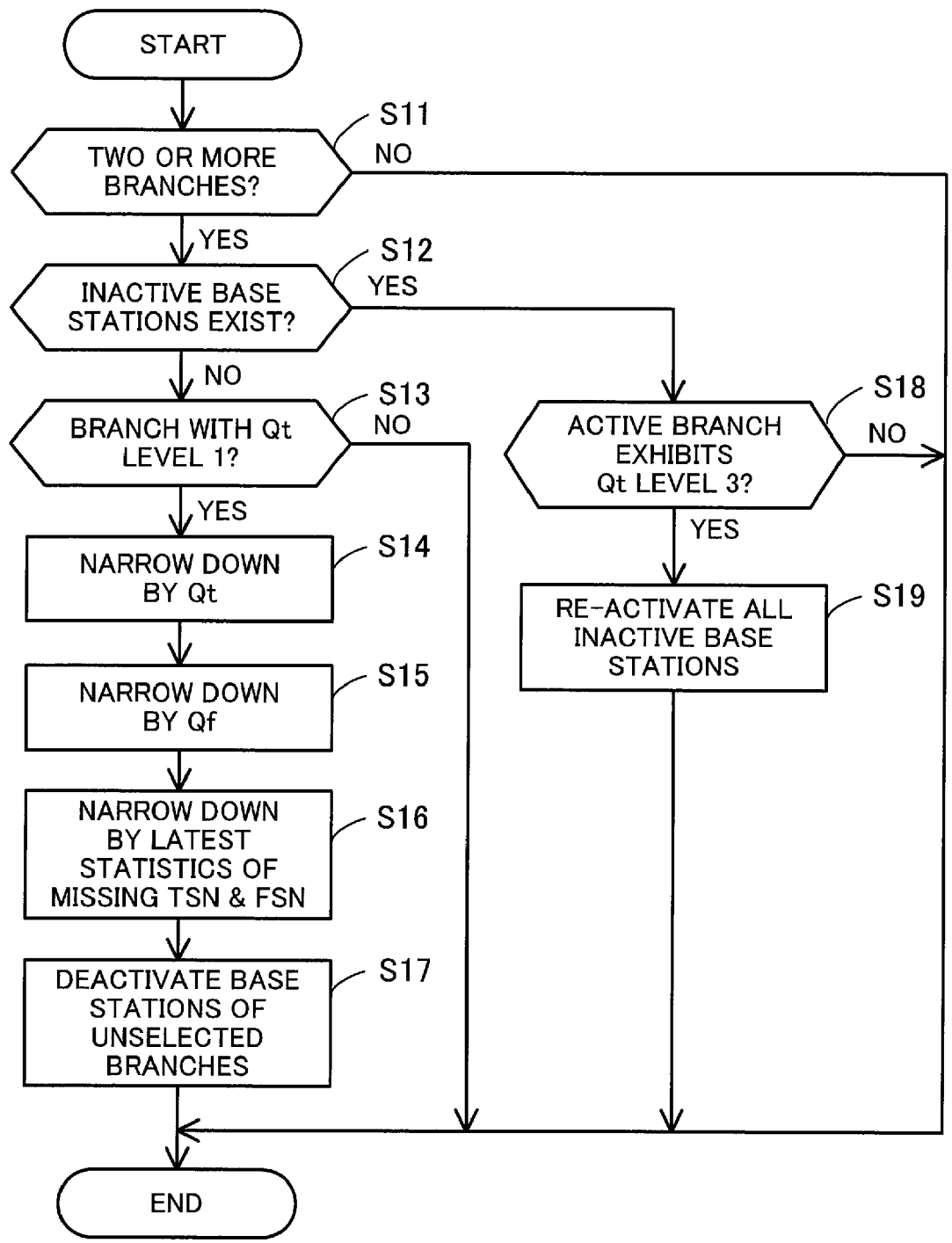
FIG. 9 is a flowchart of a link control process according to the first embodiment.

FIG. 9 is a flowchart of a link control process according to the first embodiment. The RNC 300 repeats this process during the time when the mobile station 100 is engaged in a communication session. The process of FIG. 9 proceeds according to the following steps:

(step S11) The link controller 330 determines whether there are a plurality of branches between the mobile station 100 and RNC 300 (i.e., whether the mobile station 100 is communicating with a plurality of radio base stations). If so, the process advances to step S12. If not, this link control process terminates.

(step S12) The link controller 330 determines whether there are inactive radio base stations that have stopped forwarding data (i.e., whether there are inactive branches). If so, the process advances to step S18. If not, the process proceeds to step S13.

(step S13) The link controller 330 then examines each branch between the mobile station 100 and RNC 300, thus determining whether any branch exhibits a quality indicator Qt of level 1 (i.e., whether there is a branch with good transmission quality). If there is at least one such branch, the process advances to step S14. If there are no such branches, this link control process terminates.

(step S14) The link controller 330 examines quality indicator Qt to extract level-1 branches out of the branches established between the mobile station 100 and RNC 300.

(step S15) If two or more branches are extracted at step S14, then the link controller 330 consults another quality indicator Qf of each of them, thus selecting branches with the largest Qf from among the extracted branches.

(step S16) If two or more branches are extracted at step S15, then the link controller 330 selects a branch that exhibits a smallest number of missing TSNs and missing FSNs in the latest statistics for a predetermined period, thereby narrowing the selection down to one.

(step S17) Now that one branch has survived the narrowing-down process of steps S14 to S16, the link controller 330 selects that branch as the sole data path to the RNC 300. Then, to each radio base station corresponding to non-selected branches between the mobile station 100 and RNC 300, the link controller 330 sends a control frame requesting to stop data forwarding operation. This step prevents uplink data of the non-selected branches from flowing into the RNC 300.

(step S18) The link controller 330 determines whether the active branch serving the Iub section exhibits a quality indicator Qt of level 3 (i.e., whether its transmission quality has been degraded). If so, the process advances to step S19. If the quality indicator Qt remains at level 1 or level 2, this link control process terminates.

(step S19) To all radio base stations to which it has requested to stop forwarding operation, the link controller 330 sends a control frame requesting to resume data forwarding operation. This step enables data from all branches to flow into the RNC 300 again.

Through the above-described process, the RNC 300 consults quality indicator Qt of available branches so as to single out a level-1 branch for data transport while disabling data flow from the other branches, expecting that sufficient quality of communication service will be achieved with such a level-1 branch alone. In the case where two or more level-1 branches, the RNC 300 narrows down the selection by consulting another quality indicator Qf and/or the latest statistics of missing TSNs and FSNs. The RNC 300 maintains the selection of branches as long as the quality indicator Qt of the active branch is level 1 or level 2. If the quality indicator Qt goes down to level 3, the RNC 300 re-activates all available branches, thus accepting all incoming data from those branches.

Figure 10:
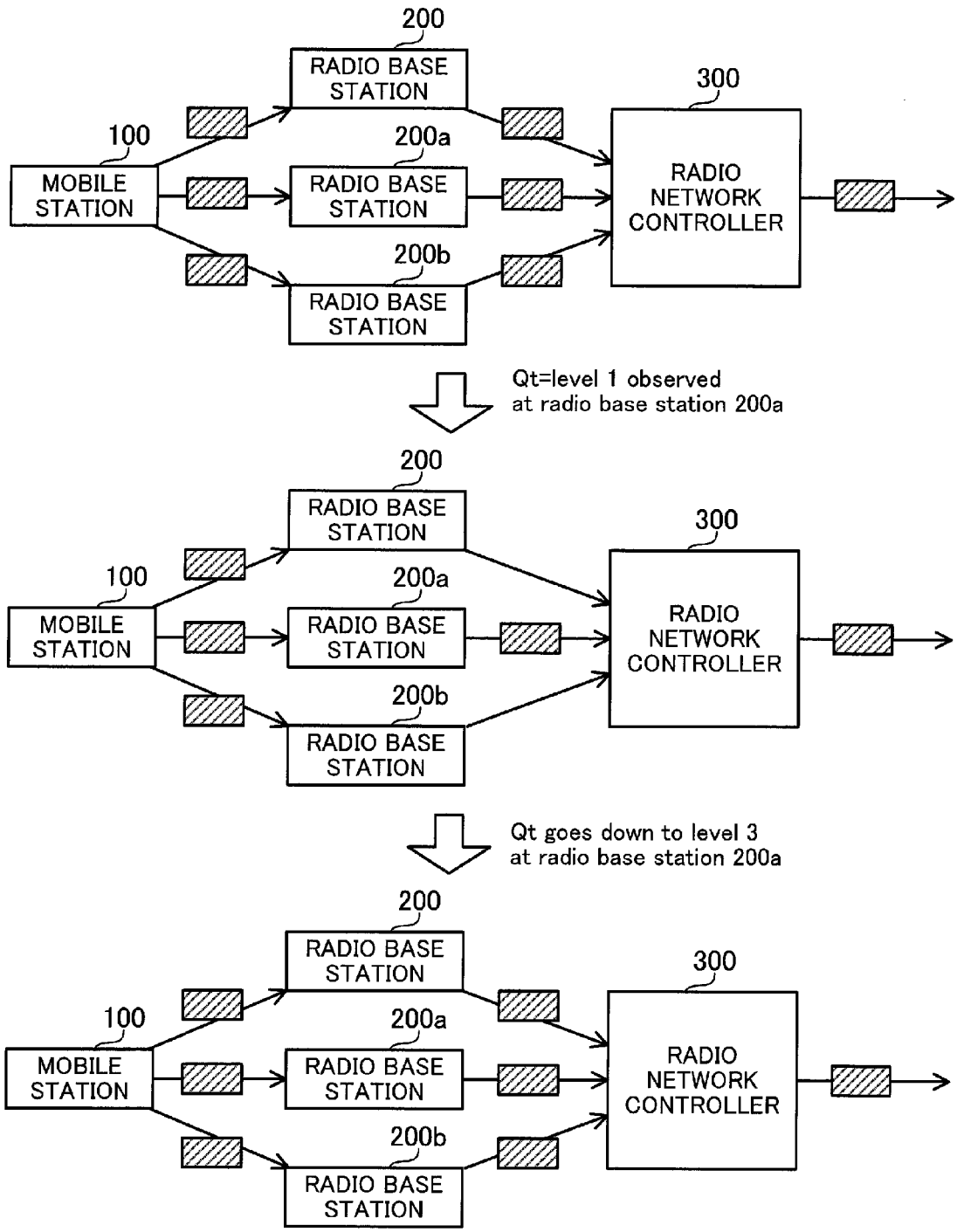
FIG. 10 depicts how the system works according to the first embodiment when there is a change in the environment for frame transmission.

FIG. 10 depicts how the system works according to the first embodiment when there is a change in the environment for frame transmission. It is assumed here that a mobile station 100 is sending data to three radio base stations 200, 200a, and 200b. The topmost portion of FIG. 10 illustrates an initial state of the system, in which the RNC 300 receives data from all the three radio base stations 200, 200a, and 200b.

Suppose that the branch running through the second radio base station 200a gives a quality indicator Qt of level 1, while the other two branches exhibit level 2 or 3. The RNC 300 therefore commands two radio base stations 200 and 200b to stop their data forwarding operation. Accordingly, the first and third radio base stations 200 and 200b stop forwarding data to the RNC 300, and only the second radio base station 200a continues forwarding data to the RNC 300.

Suppose now that the quality indicator Qt of the branch involving the second radio base station 200a has changed to level 3. The RNC 300 then commands the other two radio base stations 200 and 200b to resume their data forwarding operation, thereby permitting all the three radio base stations 200, 200a, and 200b to forward their respective receive data to the RNC 300. Afterward, the RNC 300 controls whether to activate or deactivate data forwarding operation at the radio base stations 200, 200a, and 200b, depending on each station's quality indicator Qt.

To summarize the above-described first embodiment, the proposed radio communications system restricts data forwarding operation at radio base stations 200, 200a, and 200b in the case where it is determined that the system can ensure sufficient quality of communication by using one of a plurality of branches between a mobile station 100 and an RNC 300. Besides reducing the amount of data traffic on Iub links, this mechanism alleviates processing load of the RNC 300. When the selected branch experiences degradation of transmission quality, the proposed radio communications system tries to maintain the required transmission quality by activating all branches again such that the RNC 300 will receive data from every branch. The proposed system evaluates the transmission quality of each branch by consulting statistics of missing TSNs and FSNs observed at the RNC 300. This feature enables adequate selection of branches that reflects the state of Iub links.

[b] Second Embodiment

A second embodiment of the present invention will now be described in detail below with reference to the accompanying drawings. The description will focus on its differences from the foregoing first embodiment, thus omitting explanation for the elements common to those two embodiments. The second embodiment provides a radio communications system which resumes data forwarding operation at some of the available radio base stations, rather than doing so at all of them, when the current active branch experiences degradation in its transmission quality.

The radio communications system of the second embodiment can be implemented with the same system structure as that of the first embodiment discussed in FIG. 2, except for several functions in the radio base stations and radio network controller (RNC). Specifically, the second embodiment includes radio base stations 400, 400a, and 400b and RNC 500 described below, in place of the radio base stations 200, 200a, and 200b and RNC 300 in the first embodiment.

Figure 11:
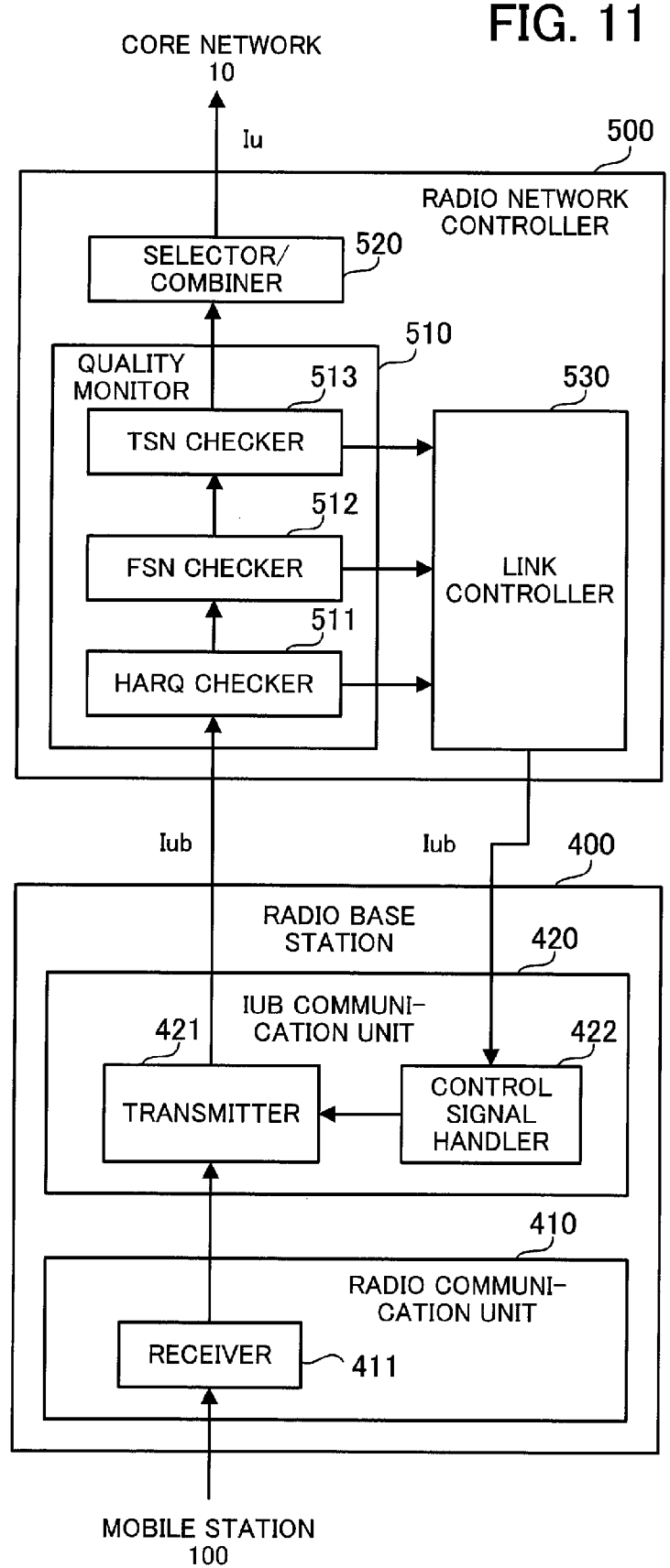
FIG. 11 is a functional block diagram illustrating a radio base station and an RNC according to a second embodiment of the present invention.

FIG. 11 is a functional block diagram illustrating a radio base station 400 and an RNC 500 according to the second embodiment. The illustrated radio base station 400 has a radio communication unit 410 and an Iub communication unit 420. The RNC 500, on the other hand, has a quality monitor 510, a selector/combiner 520, and a link controller 530. The description will focus on how the RNC 500 handles uplink data from a mobile station 100, while omitting details of other functions.

The radio communication unit 410 controls communication with the mobile station 100 over a radio link. Included in this radio communication unit 410 is a receiver 411, which functions in the same way as the foregoing receiver 211 of the first embodiment.

The Iub communication unit 420 controls communication with the RNC 500. Included in this Iub communication unit 420 are a transmitter 421 and a control signal handler 422. The control signal handler 422 functions in the same way as the foregoing control signal handler 222 of the first embodiment.

The transmitter 421 operates in either of non-restricted forwarding mode and restricted forwarding mode. In non-restricted forwarding mode, the transmitter 421 assembles an EDCH-FP frame from data and control parameters supplied from the radio communication unit 410 and transmits it to the RNC 500. In restricted forwarding mode, on the other hand, the transmitter 421 assembles and sends a header-only EDCH-FP frame (i.e., carrying no payloads) to the RNC 500, the frame header containing a value of zero in its Number of Subframes field.

The quality monitor 510 receives EDCH-FP frames from at least one of the radio base stations 400, 400a, and 400b, while monitoring continuously the transmission quality of each branch. The quality monitor 510 has an HARQ checker 511, an FSN checker 512, and a TSN checker 513. The FSN checker 512 and TSN checker 513 function in the same way as the foregoing FSN checker 311 and TSN checker 312 of the first embodiment.

The HARQ checker 511 examines each received EDCH-FP frame. Specifically, it consults the Number of Subframes field of the frame header, thus determining whether the received EDCH-FP frame carries a payload. If no payloads are present, the HARQ checker 511 then reads the Number of HARQ Retransmissions field of the same frame header, which indicates how many times the frame has been retransmitted over the radio link section. The HARQ checker 511 reports this field value to the link controller 530, while discarding the EDCH-FP frame itself. On the other hand, if the EDCH-FP frame carries a payload, the HARQ checker 511 forwards the frame to the FSN checker 512.

Upon receipt of data from the quality monitor 510, the selector/combiner 520 identifies a plurality of data units with the same content. The selector/combiner 520 then selects and combines those data units according to their quality, thereby narrowing them down to a single data stream for output to the core network 10.

The link controller 530 calculates a quality indicator representing transmission quality of each active branch serving the Iub section, based on the statistics of FSNs and TSNs that is obtained from the quality monitor 510. The link controller 530 calculates similarly another quality indicator of each inactive branch in the Iub section, based on the number of retransmissions reported by the quality monitor 510. More specifically, the link controller 530 keeps ten latest records of the number of retransmissions to calculate their average, best, and worst values for later use as quality indicators. Then, depending on whether those quality indicators satisfy predetermined quality requirements, the link controller 530 issues control signals to command the radio base stations 400, 400a, and 400b to stop or resume their data forwarding operation.

Figure 12:
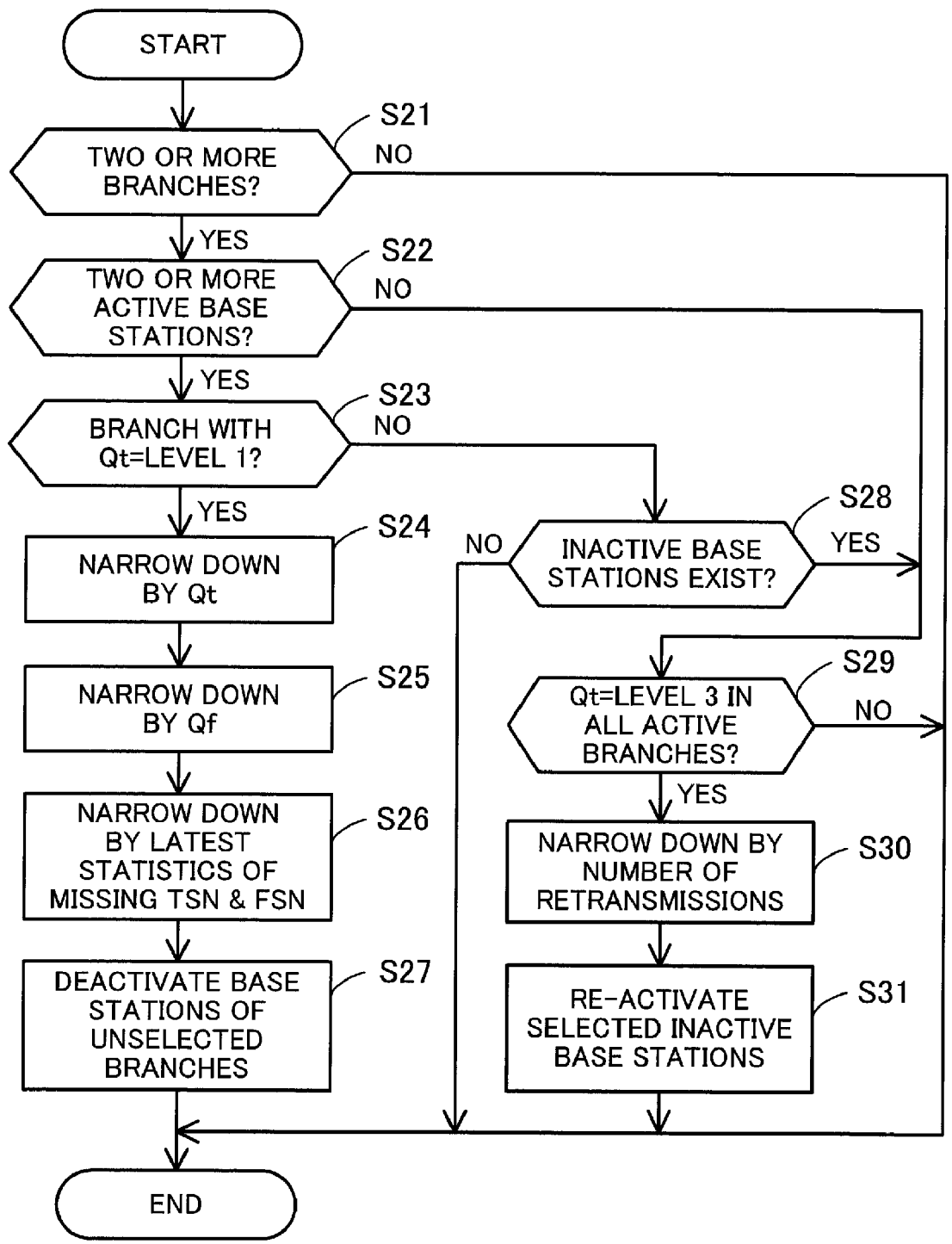
FIG. 12 is a flowchart of a link control process according to the second embodiment.

FIG. 12 is a flowchart of a link control process according to the second embodiment. The RNC 500 repeats this process during the time when the mobile station 100 is engaged in a communication session. The process of FIG. 12 proceeds according to the following steps:

(step S21) The link controller 530 determines whether there are a plurality of branches between the mobile station 100 and RNC 500. If so, the process advances to step S22. If not, this link control process terminates.

(step S22) The link controller 530 determines how many active radio base stations are working currently. If there are two or more active radio base stations, the process advances to step S23. If there is only one such station, the process advances to step S29.

(step S23) The link controller 530 determines whether any of the active branches serving the Iub section exhibits a quality indicator Qt of level 1. If there is at least one level-1 branch, the process advances to step S24. If there are no level-1 branches, the process advances to step S28.

(step S24) The link controller 530 extracts the level-1 active branches serving the Iub section.

(step S25) If two or more branches are extracted at step S24, then the link controller 530 consults another quality indicator Qf of each of them, thus selecting branches with the largest Qf from among the extracted branches.

(step S26) If two or more branches are extracted at step S25, then the link controller 530 selects a branch that exhibits a smallest number of missing TSNs and missing FSNs in the latest statistics for a predetermined period, thereby narrowing the selection down to one.

(step S27) Now that one branch has survived the narrowing-down process of steps S24 to S26, the link controller 530 selects that branch as the sole data path to the RNC 500. Then, to each radio base station corresponding to non-selected active branches, the link controller 530 sends a control frame requesting them to stop data forwarding operation.

(step S28) The link controller 530 then examines each radio base station involved in the branches, thus determining whether there are radio base stations that have stopped forwarding data. If there are such inactive radio base stations, the process advances to step S29. If there are no such radio base stations, this link control process terminates.

(step S29) The link controller 530 determines whether every active branch serving the Iub section exhibits a quality indicator Qt of level 3. If so, the process advances to step S30. If there is at least one level-1 or level-2 branch, the link control process terminates.

(step S30) The link controller 530 singles out a branch that exhibits the best radio quality from among the inactive branches, based on the number of data retransmissions in the radio link section.

(step S31) The link controller 530 produces a control frame requesting to resume data forwarding operation and sends it to the radio base station corresponding to the branch selected at step S30.

Through the above-described process, the RNC 500 consults the quality indicator Qt of available branches so as to single out a level-1 branch for data transport while disabling data flow from the other branches, expecting that sufficient quality of communication service would be achieved with such a level-1 branch alone. In the case where two or more level-1 branches, the RNC 500 narrows down the selection by consulting another quality indicator Qf and/or latest statistics of missing TSNs and FSNs. The RNC 500 maintains the selection of branches as long as the quality indicator Qt of the active branch is level 1 or level 2. If the quality indicator Qt goes down to level 3, the RNC 500 re-activates a branch that exhibits a smallest number of retransmissions.

Figure 13:
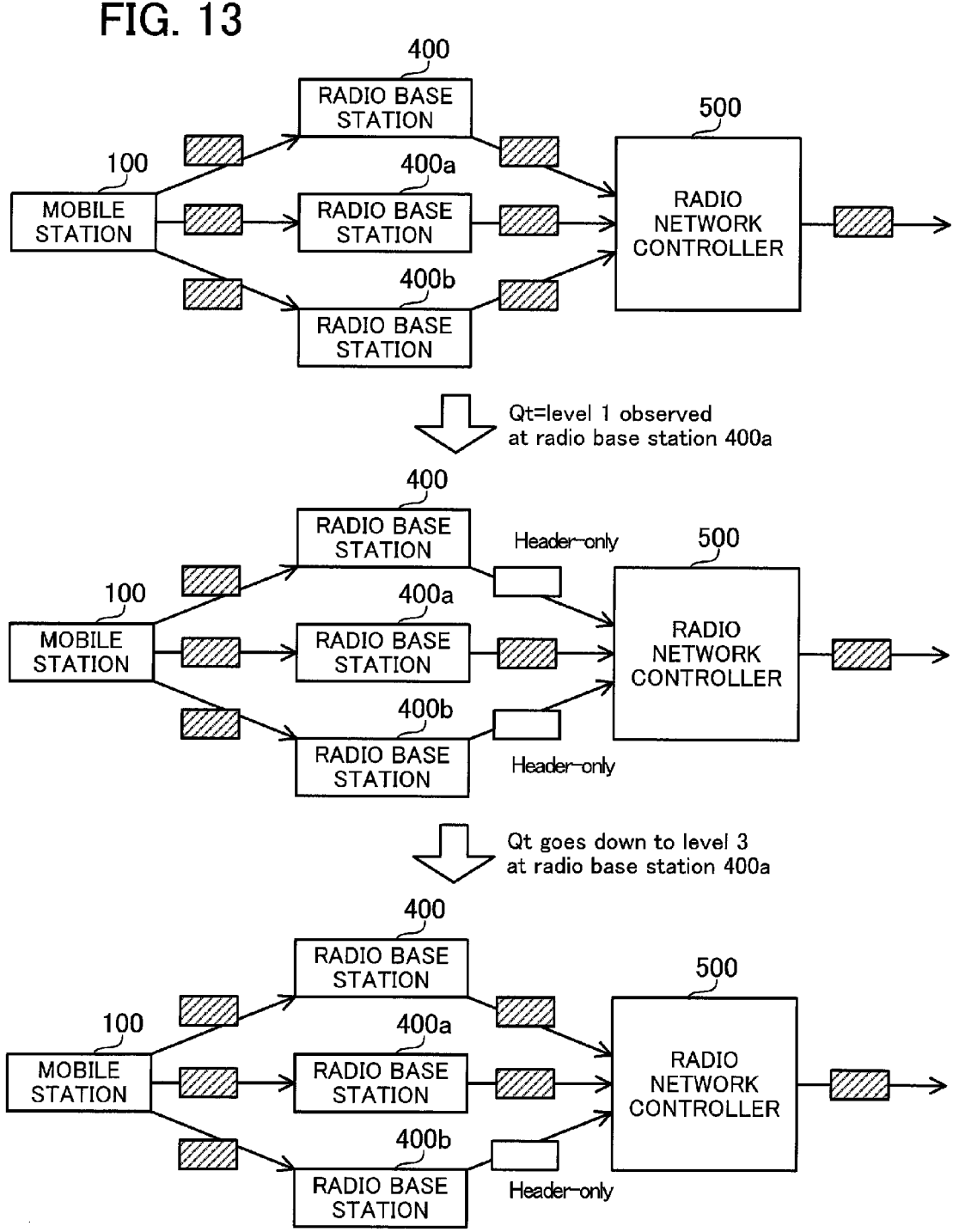
FIG. 13 depicts how the system works according to the second embodiment when there is a change in the environment for frame transmission.

FIG. 13 depicts how the system works according to the second embodiment when there is a change in the environment for frame transmission. It is assumed here that a mobile station 100 is sending data to three radio base stations 400, 400a, and 400b. The topmost portion of FIG. 13 illustrates an initial state of the system, in which the RNC 500 receives data from all the three radio base stations 400, 400a, and 400b.

Suppose that the branch running through the second radio base station 400a gives a quality indicator Qt of level 1, while the other two branches exhibit level 2 or 3. The RNC 500 therefore commands the first and third radio base stations 400 and 400b to stop their data forwarding operation. Accordingly, the second radio base station 400a transmits frames carrying payloads to the RNC 500, while the first and third radio base stations 400 and 400b transmit header-only frames to the RNC 500.

Suppose now that the quality indicator Qt of the same branch of the second radio base station 400a has dropped to level 3. The RNC 500 then selects one of the other two radio base stations 400 and 400b that observes a smaller number of retransmissions in its radio link section, thus commanding the selected radio base station 400 to resume data forwarding operation. Accordingly, two radio base stations 400 and 400a transmit frames carrying payloads to the RNC 500, while the remaining radio base station 400b transmits header-only frames to the RNC 500.

The above-described radio communications system according to the second embodiment offers the same advantages as those of the first embodiment. In addition, the radio communications system of the second embodiment resumes data forwarding operation at an inactive branch that is expected to provide better quality than other inactive branches, when the current active branch is unable to keep its transmission quality. Besides reducing the amount of data traffic on Iub links, this mechanism alleviates processing load of the RNC 500.

[c] Third Embodiment

A third embodiment of the present invention will now be described in detail below with reference to the accompanying drawings. The description will focus on its differences from the foregoing first embodiment, thus omitting explanation for the elements common to those two embodiments.

Figure 14:
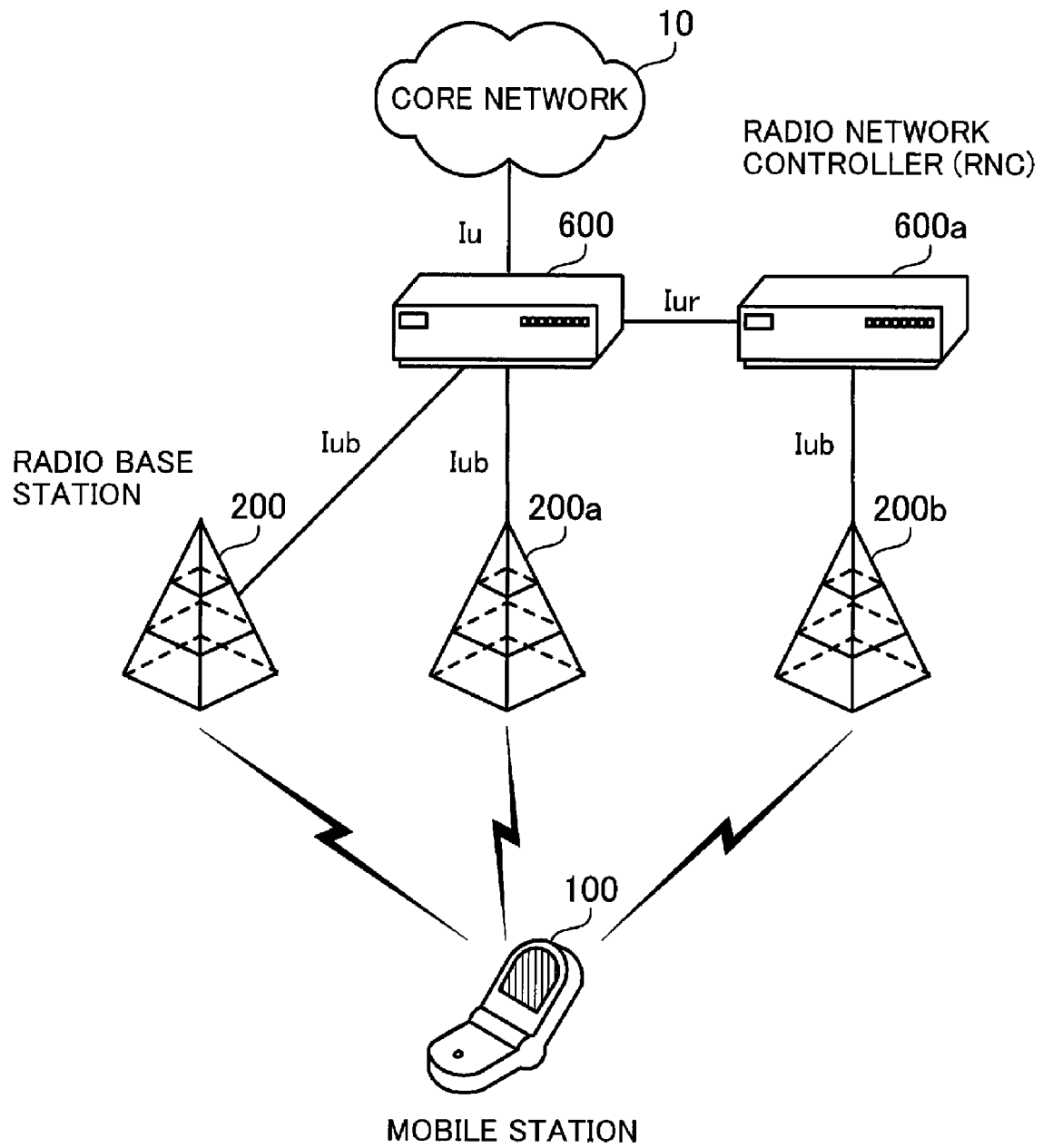
FIG. 14 illustrates a structure of a radio communications system according to a third embodiment of the present invention.

FIG. 14 illustrates a structure of a radio communications system according to a third embodiment of the present invention. Unlike the first embodiment, the radio communications system of the third embodiment includes a plurality of radio network controllers (RNCs). Specifically, the illustrated radio communications system includes a core network 10, a mobile station 100, three radio base stations 200, 200a, and 200b and two RNCs 600 and 600a. Two radio base stations 200 and 200a are connected to their RNC 600 via wired links, while another radio base station 200b is connected to its RNC 600a via another wired link. The two RNCs 600 and 600a are interconnected via yet another wired link. The RNC 600 is further connected to the core network 10. The connection between the RNCs 600 and 600a is called an Iur link, which will be used in a communication session of the mobile station 100.

Once the mobile station 100 initiates a radio communication session, one RNC is assigned the role of "serving RNC" to collect transmitted data, and the other RNC functions the role of "drift RNC" to forward received data to the serving RNC. In the system of FIG. 14, the RNC 600 illustrated at the left functions as a serving RNC, while the RNC 600a at the right functions as a drift RNC.

The mobile station 100 sends data to three radio base stations 200, 200a, and 200b. In the beginning, the first two radio base stations 200 and 200a receive the data and forward it to the serving RNC 600 via their respective Iub links. Another radio base station 200b, on the other hand, sends received data to the drift RNC 600a via its Iub link. The drift RNC 600a forwards the data from the radio base station 200b to the serving RNC 600 via its Iur link. In this way, multiple identical data units transmitted from the mobile station 100 are concentrated at the serving RNC 600 for the purpose of selection and combining. The resulting data stream is then sent out to the core network 10.

The link control methods described earlier in the first and second embodiments can be implemented in the system illustrated in FIG. 14. That is, the serving RNC 600 sends control frames directly to its radio base stations 200 and 200a via Iub links. For the radio base station 200b, the serving RNC 600 passes those control frames to the drift RNC 600a via the Iur link, so that the frames will be forwarded to the radio base station 200b.

As can be seen from the above description, the serving RNC controls data forwarding operation of a radio base station under a drift RNC by sending control frames via the drift RNC. In this way, the third embodiment offers link control functions equivalent to those of the foregoing first and second embodiments. While two RNCs 600 and 600a are directly connected together in the example of FIG. 14, it is possible to modify the links such that the RNCs 600 and 600a be connected indirectly via the core network 10.

[d] Variations

The foregoing three embodiments may be modified in various ways. For example, the foregoing embodiments select branches based on statistics of missing FSNs in preference to that of missing TSNs. The present invention, however, is not limited to that usage of FSN and TSN. Rather, the foregoing embodiments may be modified to use TSN in preference to FSN in selecting branches.

To determine the quality of radio links, the foregoing embodiments may be modified to use other appropriate quality indicators than the number of retransmissions in a radio link section. An additional intermediate network device may be interposed between radio base stations and their RNC.

Further, the foregoing embodiments may be applied, not only to CDMA-based radio communications systems, but also to other types of radio communications systems that permit a mobile station to communicate with a plurality of radio base stations.

[e] Conclusion

The above sections have described preferred embodiments of a communication method and an intermediate network device according to the present invention. The proposed communication method and intermediate network device adequately determine which radio base stations should stop forwarding data from a mobile station.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method for use in a radio communications system including a plurality of radio base stations to receive data transmitted from a mobile station over radio links and an intermediate network device to collect the received data from the radio base stations via a network, the communication method comprising:

transmitting identical first data packets from the mobile station to the plurality of radio base stations in a parallel fashion, wherein first sequence numbers are affixed to the first data packets at the mobile station;

forwarding the first data packets from each of the radio base stations to the intermediate network device by transmitting second data packets each of which includes two or more of the first data packets, wherein second sequence numbers are affixed to the second data packets at each of the radio base stations;

receiving, at the intermediate network device, the second data packets from the radio base stations;

checking, at the intermediate network device, the second sequence numbers affixed to the received second data packets and the first sequence numbers affixed to the first data packets included in the received second data packets, thereby detecting missing first sequence numbers and missing second sequence numbers;

selecting, at the intermediate network device, at least one of the radio base stations based on a combination of statistics of the missing first sequence numbers and statistics of the missing second sequence numbers;

permitting the selected at least one radio base station to continue said forwarding operation;

requesting, from the intermediate network device, non-selected radio base stations to stop said forwarding operation; and requesting, from the intermediate network device to all the non-selected radio base stations, to resume said forwarding operation when the combination of statistics of the missing first sequence numbers and statistics of the missing second sequence numbers of the selected radio base station becomes lower than a threshold.

2. A communication method for use in a radio communications system including a plurality of radio base stations to receive data transmitted from a mobile station over radio links and an intermediate network device to collect the received data from the radio base stations via a network, the communication method comprising:

transmitting identical data from the mobile station to the plurality of radio base stations in a parallel fashion;

forwarding the data from each of the radio base stations to the intermediate network device;

receiving, at the intermediate network device, the data forwarded from the radio base stations;

checking, at the intermediate network device, sequence numbers affixed to the received data, thereby detecting missing sequence numbers;

selecting, at the intermediate network device, a radio base station whose quality determined by statistics of the missing sequence numbers is higher than a first threshold;

permitting the selected radio base station to continue said forwarding operation;

requesting, from the intermediate network device, non-selected radio base stations to stop said forwarding operation; and requesting, from the intermediate network device to all the non-selected radio base stations, to resume said forwarding operation when the quality of the selected radio base station becomes lower than a second threshold, the second threshold being lower than the first threshold.

3. A communication method for use in a radio communications system including a plurality of radio base stations to receive data transmitted from a mobile station over radio links and an intermediate network device to collect the received data from the radio base stations via a network, the communication method comprising:

transmitting identical data from the mobile station to the plurality of radio base stations in a parallel fashion;

forwarding the data from each of the radio base stations to the intermediate network device;

receiving, at the intermediate network device, the data forwarded from the radio base stations;

checking, at the intermediate network device, sequence numbers affixed to the received data, thereby detecting missing sequence numbers;

selecting, at the intermediate network device, at least one of the radio base stations based on statistics of the missing sequence numbers;

permitting the selected at least one radio base station to continue said forwarding operation;

requesting, from the intermediate network device, non-selected radio base stations to stop said forwarding operation;

producing, at the non-selected radio base stations that have stopped said forwarding operation, a header corresponding to data received from the mobile station; and sending the produced header from the non-selected radio base stations to the intermediate network device without forwarding the received data.

4. The communication method according to claim 3, further comprising:

producing, at the non-selected radio base stations that have stopped said forwarding operation, a header containing information about how many times the mobile station have retransmitted the data for correct reception; and sending the produced header from the non-selected radio base stations to the intermediate network device.

5. The communication method according to claim 3, further comprising:

producing, at the non-selected radio base stations that have stopped said forwarding operation, a header corresponding to data received from the mobile station;

sending the produced header from the non-selected radio base stations to the intermediate network device;

determining which of the non-selected radio base stations should resume said forwarding operation, based on the header received therefrom, if the statistics of missing sequence numbers that the selected radio base station is experiencing fails to satisfy a predetermined quality requirement; and requesting, from the intermediate network device, the determined radio base stations to resume said forwarding operation.

6. The communication method according to claim 1, wherein:

the non-selected radio base stations are under control of another intermediate network device; and said requesting operation requests the non-selected radio base stations via said another intermediate network device to stop said forwarding operation.

7. An intermediate network device, for use in a radio communications system including a plurality of radio base stations to receive data from a mobile station via radio links, for collecting the received data from the radio base stations via a network, the intermediate network device comprising:

a monitor, activated when the mobile station transmits identical first data packets to the plurality of radio base stations in a parallel fashion and each of the radio base stations forwards the first data packets by transmitting second data packets each of which includes two or more of the first data packets, that checks second sequence numbers affixed to the second data packets received from each of the radio base stations and first sequence numbers affixed to the first data packets included in the received second data packets, thereby detecting missing first sequence numbers and missing second sequence numbers, wherein the first sequence numbers are affixed to the first data packets at the mobile station and the second sequence numbers are affixed to the second data packets at each of the radio base stations; and a controller that selects at least one of the radio base stations based on a combination of statistics of the missing first sequence numbers and statistics of the missing second sequence numbers, and permits the selected radio base station to continue data forwarding operation, while requesting non-selected radio base stations to stop data forwarding operation and requesting to all the non-selected radio base stations to resume said forwarding operation when the combination of statistics of the missing first sequence numbers and statistics of the missing second sequence numbers of the selected radio base station becomes lower than a threshold.

\* \* \* \* \*